(12) United States Patent
Song et al.

(10) Patent No.: US 11,672,376 B2
(45) Date of Patent: Jun. 13, 2023

(54) ELECTRIC HEATER AND COOKING APPLIANCE HAVING SAME

(71) Applicant: LG ELECTRONICS INC., Seoul (KR)

(72) Inventors: Misun Song, Seoul (KR); Yooseok Kwon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 224 days.

(21) Appl. No.: 16/546,708

(22) Filed: Aug. 21, 2019

(65) Prior Publication Data

US 2020/0060468 A1 Feb. 27, 2020

(30) Foreign Application Priority Data

Aug. 21, 2018 (KR) .................. 10-2018-0097650

(51) Int. Cl.
*A47J 36/24* (2006.01)
*H05B 3/74* (2006.01)
*H05B 3/03* (2006.01)

(52) U.S. Cl.
CPC ............ *A47J 36/2483* (2013.01); *H05B 3/03* (2013.01); *H05B 3/74* (2013.01)

(58) Field of Classification Search
CPC ... H05B 3/03; H05B 3/10; H05B 3/20; H05B 3/22; H05B 3/26; H05B 3/32; H05B 2203/002; H05B 2203/003; H05B 2203/004; H05B 2203/005; H05B 2203/0017; H05B 2203/013
See application file for complete search history.

(56) References Cited

U.S. PATENT DOCUMENTS

| | | | |
|---|---|---|---|
| 4,973,826 A | 11/1990 | Baudry et al. | |
| 6,392,205 B1* | 5/2002 | Minonishi | H01L 21/67103 219/443.1 |
| 7,417,206 B2* | 8/2008 | Nakamura | H01L 21/67103 219/444.1 |
| 9,330,953 B2 | 5/2016 | Miura et al. | |
| 10,314,113 B2 | 6/2019 | Russegger et al. | |
| 2004/0074893 A1 | 4/2004 | Wermbter et al. | |
| 2004/0108308 A1* | 6/2004 | Okajima | H01L 21/67109 219/468.1 |
| 2005/0109771 A1* | 5/2005 | Bower | H05B 3/22 219/635 |
| 2008/0078756 A1 | 4/2008 | Russegger et al. | |
| 2009/0218333 A1 | 9/2009 | Kaastra | |
| 2010/0193502 A1 | 8/2010 | Kim et al. | |

(Continued)

FOREIGN PATENT DOCUMENTS

| | | |
|---|---|---|
| CA | 2658123 A1 | 1/2008 |
| CN | 103443914 U | 12/2013 |
| CN | 204887524 U | 12/2015 |

(Continued)

*Primary Examiner* — Justin C Dodson
(74) *Attorney, Agent, or Firm* — Dentons US LLP (57) ABSTRACT

An electric heater includes a substrate; and a plane heating element disposed on one surface of the substrate, in which the plane heating element includes a pattern portion including a start point and an end point; and an electrode portion connected to the start point and the end point of the pattern portion, and a thickness of the electrode portion is thicker than a thickness of the pattern portion.

18 Claims, 8 Drawing Sheets

(56) References Cited

U.S. PATENT DOCUMENTS

2019/0041630 A1* 2/2019 Park ................ G02B 7/028
2019/0248211 A1* 8/2019 Seki ................ H05B 3/36

FOREIGN PATENT DOCUMENTS

| CN | 107180921 A | 9/2017 |
|----|----|----|
| EP | 228808 | 7/1987 |
| EP | 0319079 A1 | 6/1989 |
| EP | 1905271 A2 | 4/2008 |
| EP | 2044810 A1 | 4/2009 |
| JP | 2001-102159 A | 4/2001 |
| JP | 2005-019899 A | 1/2005 |
| JP | 2014-053574 A | 3/2014 |
| KR | 10-1998-070690 A | 10/1998 |
| KR | 10-2009-0023490 A | 3/2009 |
| KR | 20-2017-0002715 U | 7/2017 |
| KR | 101762159 | 7/2017 |
| WO | 02/071806 A1 | 9/2002 |
| WO | 2007/008075 A2 | 1/2007 |
| WO | 2008/011507 A1 | 1/2008 |
| WO | 2009/014333 A1 | 1/2009 |

* cited by examiner

ELECTRIC HEATER AND COOKING APPLIANCE HAVING SAME

CROSS-REFERENCE TO RELATED APPLICATIONS

This application claims priority to Korean Patent Application No. 10-20018-0097650, filed on Aug. 21, 2018, which is hereby incorporated by reference in its entirety.

FIELD OF THE DISCLOSURE

The present disclosure relates to an electric heater applied to a cooking appliance, and to an electric heater including a plane heating element capable of effectively lowering a heating temperature of an electrode portion even when an electrode portion is disposed within a limited area.

BACKGROUND

In general, a cooking appliance refers to a device for heating and cooking food using gas or electricity. Various devices such as a microwave oven using microwaves, an oven using a heater, a gas stove using gas, an electric stove using electricity, or a cooktop including a gas stove or an electric stove have come into widespread use for heating and cooking.

The gas stove directly generates flame using gas as a heating source, while the electric stove heats a container and food placed on a top plate thereof using electricity.

In the gas stove, heat loss of the flame may be large and contaminants may be discharged due to incomplete combustion, thereby polluting indoor air. Therefore, recently, electric stoves are attracting attention.

Electric stoves may be classified into an inductive electric stove which directly heats a container in which a magnetic field is generated by a magnetic induction method, and a resistive electric stove which heats a top surface made of, for example, ceramic using a hot wire.

The inductive electric stove has a short cooking time at a high temperature and must use a dedicated magnetic container. The resistive electric stove may use an existing container but has a relatively long cooking time.

Even if an existing resistive electric stove uses a heating element made of a nichrome wire, an electric heater using a plane heating element is being developed in order to reduce the thickness of the heating element.

In addition, in order to shorten the cooking time, a resistive electric stove using an electric heater capable of heating a limited area at a high temperature is being developed.

As an example of such an electric heater, Korean Patent Registration No. 10-1762159 B1 (published on Aug. 4, 2017) discloses a plane heating element including a substrate including a surface made of an electrically insulating material, a heating element attached to the surface of the substrate and having a predetermined shape, and a power supply for supplying electricity to the heating element.

In the electric heater, the temperature distribution of an object to be heated may be changed according to the shape (that is, the pattern) of the plane heating element, and the plane heating element may be formed in a shape capable of heating the object to be heated as uniformly as possible.

The plane heating element of the electric heater includes a plurality of tracks having a straight-line shape or an arc shape and adjacent tracks of the plurality of tracks may be connected through a bridge (or a track).

As another example of the heater, European Patent Publication No. EP 0,228,808 A2 (published on Jul. 15, 1987) discloses a temperature sensitive device. Such a device is configured by printing a heater track made of a conductive material and a plurality of electrodes on a ceramic coating layer. As current is supplied through the electrodes, radiant heat is generated in the heater track.

SUMMARY

However, existing plane heating elements include a heating unit in which a single hot wire is formed within a limited area in a predetermined pattern shape, and the heating portion is designed to have a high resistance in order to heat at a high temperature of 500° C. or higher.

Of course, an electrode for supplying current to the pattern is provided, and the electrode should be configured to have a low resistance so as not to heat.

In order to configure the resistance of the electrode to be significantly lower than the resistance of the pattern, the electrode may be configured to be much wider than the width of the pattern.

However, the required power required for each size of the cooking appliance differs, and there is a limit in configuring the pattern only by one hot wire in order to heat up to a high temperature step by step according to the user's need.

A plane heating heater having a plurality of patterns and a plurality of electrodes may be configured, but it may be provided in a limited area.

However, in order to connect a plurality of electrodes to one power supply, the electrodes should be located close to each other in a limited area in the same direction, and there is a limit to lowering the resistance of the electrodes by making the electrodes wider than the width of the pattern.

Meanwhile, if a pattern is disposed in a limited area and generates heat at a high temperature, there is a problem that local heat is generated according to the shape of the pattern, thereby breaking the heat wire.

In other words, a path difference in which current flows according to the pattern shape is generated, and a larger path difference causes a large deviation of the current density, where local heating occurs at a portion having a high current density, and a hot wire breakdown phenomenon occurs.

One aspect is to provide an electric heater including a plane heating element capable of significantly reducing the resistance of an electrode in a limited area.

Another aspect is to provide an electric heater including a plane heating element capable of preventing local heating even if a difference in current density inside the pattern portion is large.

An electric heater includes: a substrate; and a plane heating element disposed on one surface of the substrate, in which the plane heating element includes: a pattern portion including a start point and an end point; and an electrode portion connected to the start point and the end point of the pattern portion, and the a thickness of electrode portion is thicker than a thickness of the pattern portion. Therefore, the resistance of the electrode may be remarkably small in a limited area, so that an unheated unit may be constituted.

The electrode portion may include a positive electrode located outside the pattern portion and connected to the start point of the pattern portion, and a negative electrode located outside the pattern portion so as to be horizontal to the positive electrode and connected to the end point of the pattern portion.

The pattern portion may include a plurality of tracks spaced apart from each other and having an arc shape increasing from the inside to the outside, and a plurality of bridges connecting the tracks in series.

The pattern portion may be configured with a symmetrical shape with respect to a reference line passing through the center of the pattern portion.

The electrode portion may be formed to be thicker than the thickness of the track, the thickness of the electrode portion may be formed within a range of 1.3 to 2.0 with respect to the thickness of the track.

The electrode portion may generate heat at 200° C. or less during current flow.

The bridge may be formed to be thicker than the thickness of the track, the thickness of the bridge may be formed within a range of 1.3 to 2.0 with respect to the thickness of the track.

The bridge may generate heat at 500° C. or less during current flow.

Therefore, even if the difference in current density flowing along the bridge is large, the resistance of the bridge may be made small so that it is possible to prevent the bridge portion from being subjected to local heating and thereby causing insulation breakdown.

The plane heating element may include an inner side plane heating element formed at the center thereof, and at least one outer plane heating element provided to surround the inner plane heating element, and the electrode portion may include an inner electrode portion for supplying current to the inner plane heating element, and an outer electrode portion for supplying current to the outer plane heating element, that is, the pattern portion may be configured as a multi-pattern, and the heat intensity at various stages may be realized.

An electric heater includes: a substrate; and a plane heating element disposed on one surface of the substrate, in which the plane heating element includes: a pattern portion including a start point and an end point; and an electrode portion connected to the start point and the end point of the pattern portion, and the pattern portion includes a plurality of tracks spaced apart from each other and having an arc shape increasing from the inside to the outside, and a thickness of the electrode portion is thicker than a thickness of the track.

The thickness of the electrode portion may be in a range of 1.3 to 2.0 times the thickness of the track.

The electrode portion may generate heat at 200° C. or less during current flow.

The pattern portion may further include a plurality of bridges connecting the tracks in series.

The bridge may be formed to be thicker than the thickness of the track, the thickness of the bridge may be in a range of 1.3 to 2.0 times the thickness of the track.

The bridge may generate heat at 500° C. or less during current flow.

The electric heater may be configured to be thicker than the pattern portion even if the electrode portion is disposed in a limited area, and the resistance of the electrode portion may be greatly reduced. Therefore, the heating temperature of the electrode portion disposed in a limited area may be effectively lowered.

In addition, the bridges having a large difference in current density among the pattern portions are made thicker than the tracks, so that the resistance of the bridges may be configured to be significantly reduced. Therefore, it is possible to prevent the local heating and the hot wire breakage of the bridge portion of the pattern portion, and the entire area on which the pattern portion is disposed may be uniformly heated.

In addition, it may be possible to constitute a multi-pattern portion on the same plane and to provide heating intensity at various stages. Therefore, the limited area may be gradually heated to a high temperature step by step.

DETAILED DESCRIPTION OF THE PREFERRED EMBODIMENTS

Hereinafter, the preferred embodiments will be described in detail with reference to the accompanying drawings. It should be understood, however, that the scope of the inventive concept of the preferred embodiments may be determined from the matters disclosed in the present disclosure, and the spirit of the present invention possessed by the preferred embodiments include implementations such as addition, deletion, modification etc. of components to the preferred embodiments.

Figure 1:
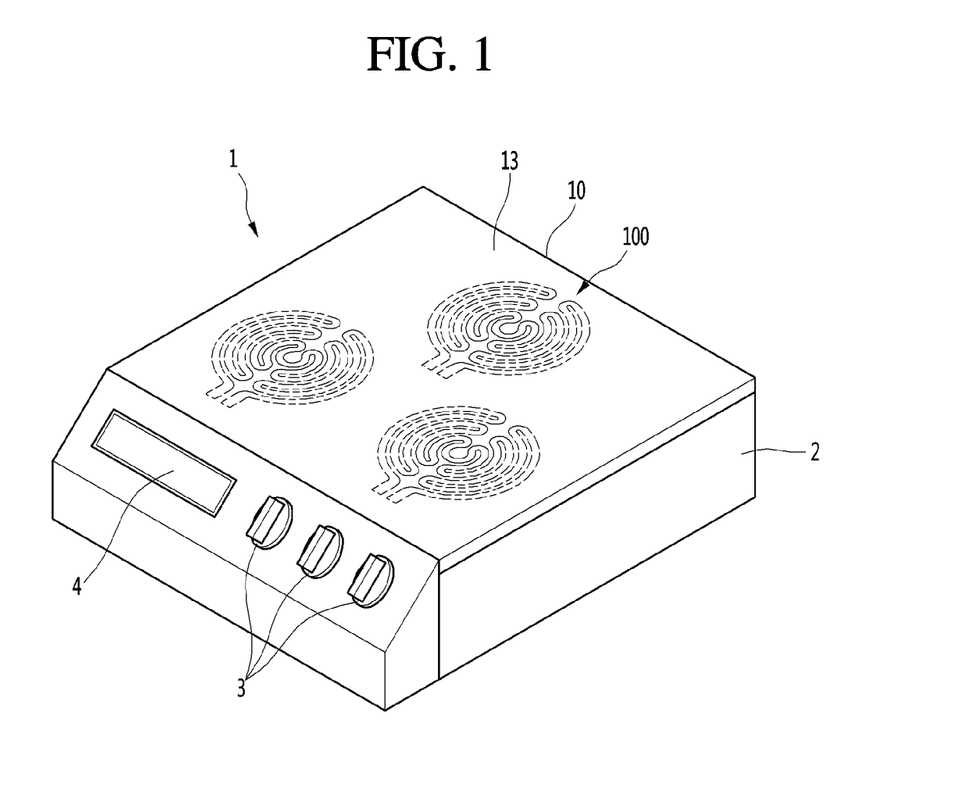
FIG. 1 is a perspective view illustrating an electric stove to which an electric heater is applied according to an embodiment of the present invention.
Figure 2:
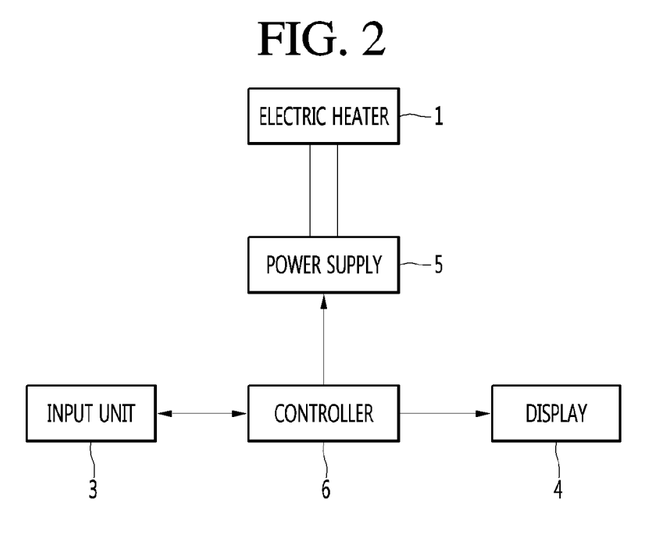
FIG. 2 is a control block diagram of an electric stove to which an electric heater according to an embodiment of the present invention is applied.

FIG. 1 is a perspective view illustrating an electric stove, to which an electric heater according to an embodiment of the present invention is applied, and FIG. 2 is a control block diagram of an electric stove, to which an electric heater according to an embodiment of the present invention is applied. The electric heater 1 of the present embodiment may configure a portion of an electric stove such as a cooktop.

The electric stove may include a case 2 forming an outer appearance. The electric heater 1 may be provided on the case 2. The upper surface of the case 2 may be opened and the electric heater 1 may be provided on the upper surface of the case 2.

The electric stove may include an input unit 3 for manipulating the electric stove and a display 4 for displaying a variety of information such as information on the electric stove. In addition, the electric stove may further include a power supply 5 connected to the electric heater 1 to apply current to the electric heater 1. Based on the configuration of the electric heater 1, the power supply may comprise of a plurality of power supplies. The electric stove may further include a controller 6 for controlling the power supply 5 and the display 4 according to input of the input unit 3. An example of the controller 6 may be a microprocessor, a digital signal processor, an electronic logic circuit, and the like. The controller 6 may control a plane heating element 100 or a plurality of plane heating elements 100, 200; 100, 200, 300 together or individually.

The electric heater 1 may be provided on the case 2 such that the upper surface thereof is exposed to the outside. An object to be heated by the electric stove may be placed on the upper surface of the electric heater 1, and the upper surface of the electric heater 1 may be a surface in which the object to be heated is seated.

Figure 3:
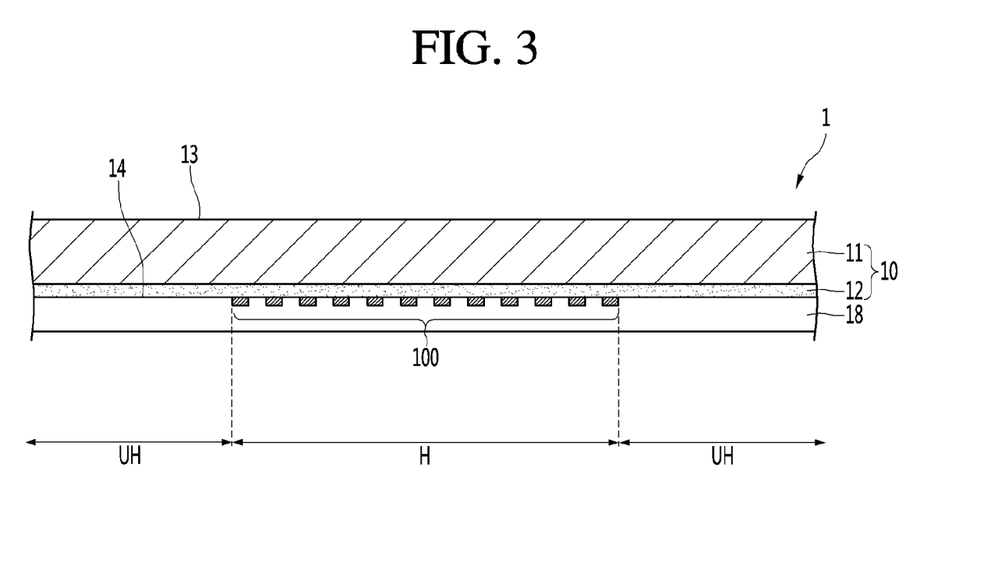
FIG. 3 is a cross-sectional view illustrating an electric heater according to an embodiment of the present invention.

FIG. 3 is a cross-sectional view illustrating an electric heater according to an embodiment of the present invention.

The electric heater 1 may include a substrate 10 and a plane heating element 100 disposed on one surface of the substrate 10.

The substrate 10 may be an insulating substrate having a conductor pattern disposed on a surface thereof. An upper surface of the substrate 10 may be a surface 13 on which the object to be heated is seated. A lower surface of the substrate 10 may be a surface 14 on which the plane heating element 100 is disposed.

The substrate 10 may include only a base 11 formed of an insulating material or may include a base 11 formed of an insulating material or a non-insulating material and an insulating layer 12 disposed on one surface of the base 11. Other layers may be added to the base 11.

The base 11 may be made of glass and the insulating layer 12 may be disposed on the lower surface of the glass using a coating or a printing method, etc.

The plane heating element 100 may be directly disposed on one surface of the base 11 formed of an insulating material or may be disposed on the insulating layer 12.

The base 11 may be formed in a shape of a plate on which the object to be heated is placed or in a shape of a container in which the object to be heated is received.

The insulating layer 12 may be disposed on the lower surface of the base 11. The insulating layer 12 may be disposed on the entire lower surface of the base 11 or may be disposed on a portion of the lower surface of the base 11. The insulating layer 12 may be disposed only in a zone in which the plane heating element 100 will be disposed. The insulating layer 12 may configure the entire lower surface of the substrate 10 or a portion of the lower surface of the substrate 10.

The plane heating element 100 may be disposed on the lower surface 14 of the insulating layer 12. The plane heating element 100 may have a size smaller than the substrate 10 and the lower surface of the substrate 10 may have a heated zone H, in which the plane heating element 100 is disposed, and an unheated zone UH located around the heated zone H.

The heater 1 may further include a coating layer 18 surrounding the plane heating element 100. The coating layer 18 may be formed of an electrically insulating material to protect the plane heating element 100.

The substrate 10 of the present embodiment may be formed of a flexible material, such as a flexible insulating film. In this case, the electric heater 1 may be a flexible planar heater. Such a flexible planar heater may be attached to a member, on which the object to be heated is placed, to heat the object to be heated, like the upper plate of the electric stove.

Figure 4:
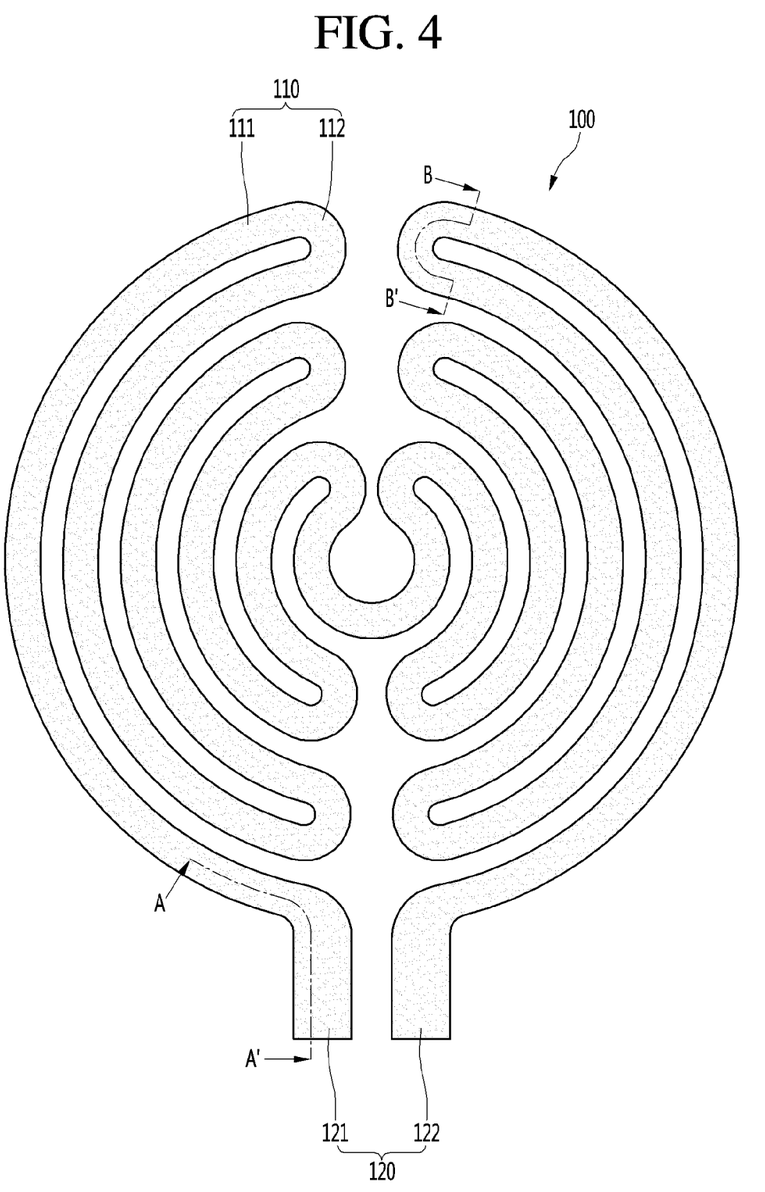
FIG. 4 is a plan view illustrating a single-type plane heating element according to an embodiment of the present invention.
Figure 5A:
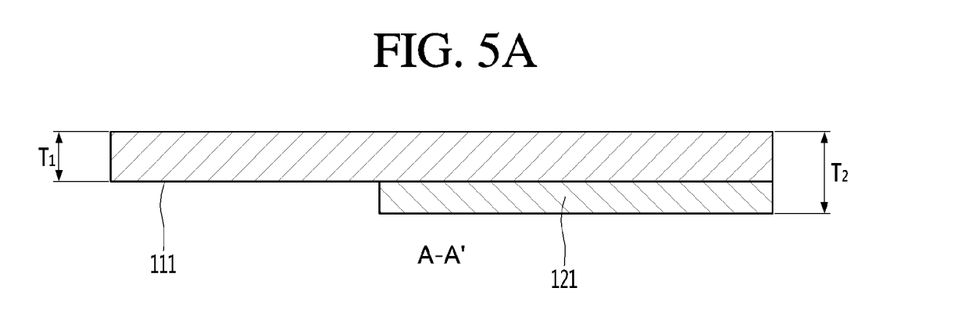
FIGS. 5A and 5B are cross-sectional views taken along line A-A' and line B-B' in FIG. 4.
Figure 5B:
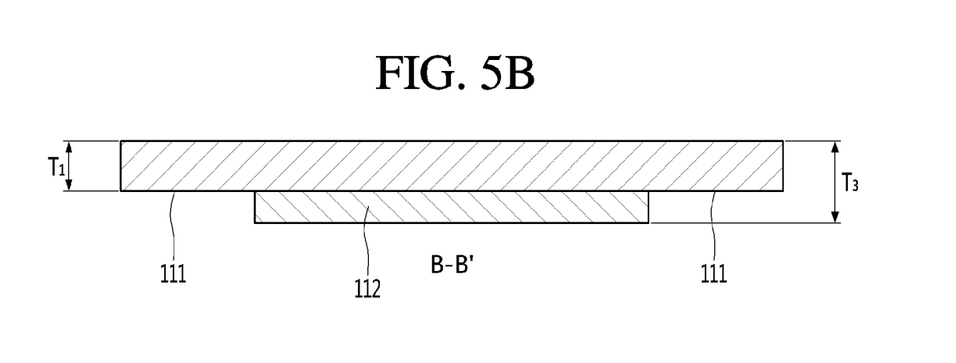

FIG. 4 is a plan view illustrating a single-type plane heating element according to an embodiment of the present invention, and FIGS. 5A and 5B are cross-sectional views taken along line A-A' and line B-B' in FIG. 4.

The single-type plane heating element according to the present embodiment comprises only a first plane heating element 100 composed of one hot wire as illustrated in FIG. 4, and includes a pattern portion 110 in which a hot wire is arranged in a predetermined shape, and an electrode portion 120 for supplying current to the pattern portion 110.

The pattern portion 110 is configured with a heating unit in which a certain kind of hot wire is closely arranged in a limited area having a circular shape, includes a start point and an end point, which are located to the outermost side of the pattern portion 110, along various paths, and is configured with a symmetrical shape with respect to the center of the pattern portion 110 illustrated in FIG. 4 in the lateral direction.

According to the embodiment, the pattern portion 110 includes a plurality of tracks 111 spaced apart from each other and increasing in size from the center toward the outermost side of the pattern portion 110, and a plurality of bridges 112 connecting the plurality of tracks 111 in series.

At this time, the area where the pattern portion 110 is disposed and the length of the hot wire which constitutes the pattern portion 110 may be set in proportion to the required power.

The electrode portion 120 is formed of a unheated unit having a relatively lower heating value than the pattern portion 110, the electrode portion 120 includes a positive electrode 121 to which current is inputted and a negative electrode 122 to which current is outputted, and the positive electrode 121 and the negative electrode 122 may be located outside the pattern portion 110 with a predetermined gap therebetween.

The positive electrode 121 is a portion which extends from the start point of the pattern portion 110 and is connected to an external input terminal, and the negative electrode 122 is a portion which extends from the end point of the pattern portion 110 and is connected to an external output terminal.

When current is supplied to the single-type plane heating element having such a structure, the current flows sequentially along the positive electrode 121, the pattern portion 110, and the negative electrode 122.

At this time, the pattern portion 110 acts as a kind of resistance to generate heat at 600° C. or higher, and an object to be heated placed on the pattern portion 110 is cooked.

However, it is preferable that the electrode portion 120 is configured to generate heat at a temperature of 200° C. or less, or substantially no heat.

Of course, the width of the electrode portion 120 may be configured to be larger than the width of the pattern portion 110 in order to greatly reduce the resistance of the electrode portion 120.

However, since the area for disposing the electrode portion 120 is limited, it is preferable that a thickness of the electrode portion 120 is thicker than a thickness of the pattern portion 110.

As illustrated in FIG. 5A, a thickness $T_2$ of the positive electrode 121 is configured to be larger than a thickness $T_1$ of the pattern portion-side track 111 and may be formed in a range of 1.3 to 2.0 times the thickness $T_1$ of the track 111 but it is not limited thereto.

Of course, the negative electrode 122 may also be configured to be thicker than the thickness $T_1$ of the track 111.

On the other hand, when current flows along the pattern portion 110, the track 111 has a gently curved shape, that is, configured with a relatively large radius of curvature, whereas the bridge 112 has a sharply curved shape, that is, configured with a relatively small radius of curvature.

At this time, a difference in density of the current flowing between an inside and outside of the bridge 112 is large, and the bridge 112 excessively generates local heat as compared with the track 111.

In order to prevent local heating of the bridge 112, it is preferable that the resistance of the bridge 112 is configured to be small.

Like the electrode portion 120, the bridge 112 may have a wide width in order to reduce the resistance, but considering the limited area, it is preferable that the bridge 112 has a large thickness.

As illustrated in FIG. 5B, a thickness T3 of the bridge 112 is configured to be larger than the thickness $T_1$ of the track 111 and may be formed in a range of 1.3 to 2.0 times the thickness $T_1$ of the track 111, but is not limited thereto.

One example of manufacturing the single-type plane heating element having the above-described structure is to print an electric energizing material on the surface of the substrate in a form of tracks, bridges, and an electrode portion, which are dried, and then the same electric energizing material or a different kind of electric energizing material is printed on the surface of the substrate once again in the form of a bridge and an electrode portion, and then the single-type plane heating element manufacturing process may be completed by firing or baking.

In addition to such a printing process, various processes such as a spray process may be used, but it is not limited thereto.

As described above, it is possible to easily manufacture the plane heating element having the bridges and the electrode portion thicker than the tracks, and the electrode portion may be made of an unheated unit and the local heating of the bridge may be solved. An unheated unit may be a unit having a lower resistance than a heating unit.

Figure 6:
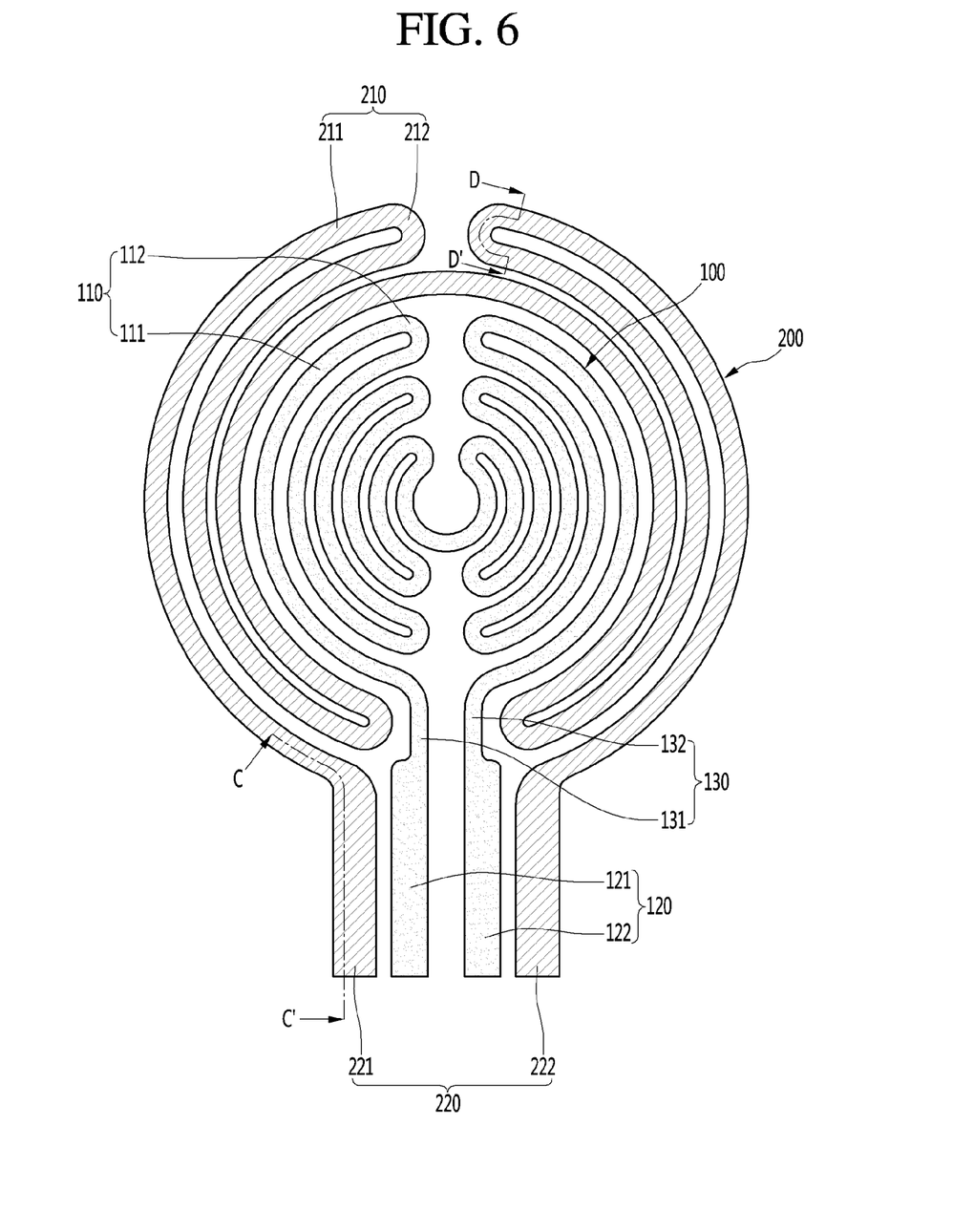
FIG. 6 is a plan view illustrating a dual-type plane heating element according to an embodiment of the present invention.
Figure 7A:
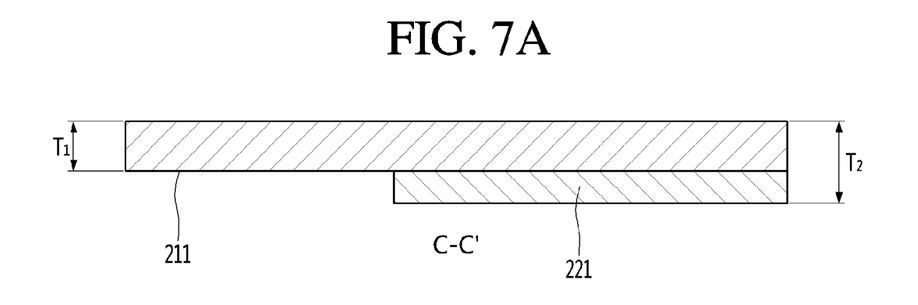
FIGS. 7A and 7B are cross-sectional views taken along lines C-C' and D-D' in FIG. 6.
Figure 7B:
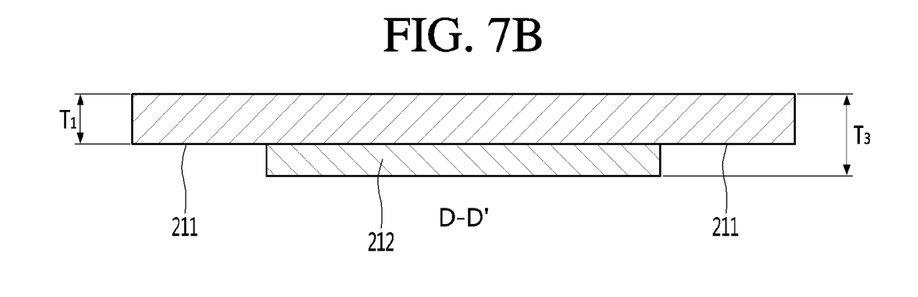

FIG. 6 is a plan view illustrating a dual-type plane heating element according to an embodiment of the present invention, and FIGS. 7A and 7B are cross-sectional views taken along lines C-C' and D-D' in FIG. 6.

As illustrated in FIG. 6, the dual-type plane heating element according to the present embodiment includes an inner plane heating element 100 located at a center of a plane, and an outer plane heating element 200 located to surround the inner plane heating element 100 and in the same plane as the inner plane heating element 100.

The inner plane heating element 100 includes an inner pattern portion 110 arranged in a predetermined shape, an inner electrode portion 120 supplying current to the inner pattern portion 110, and an inner connector 130 connecting between the inner pattern portion 110 and the inner electrode portion 120.

The inner pattern portion 110 and the inner electrode portion 120 are configured in the same manner as the pattern portion and the electrode portion described in the above-described single-type plane heating element, and a detailed description thereof will be omitted.

The inner connector 130 is formed of an auxiliary heating unit capable of generating heat at the same temperature as the inner pattern portion 110. The inner connector 130 is a portion which extends from the start point and the end point of the inner pattern portion 110 to the inner electrode portion 120.

The inner connector 130 may be located between an opening provided at one side of the outer pattern portion 210 to be described below, that is, an opening between at least one pair of outer bridges 212.

One inner connector 131 connects between the start point of the inner pattern portion 110 and the inner positive electrode 121 and the other inner connector 132 connects between the end point of the inner pattern portion 110 and the inner negative electrode 122.

Since the inner connectors 131 and 132 are directly connected to the inner positive electrode 121 and the inner negative electrode 122, when a large potential difference is generated between the inner connectors 131 and 132 during current flow, the inner connectors 131 and 132 may be short-circuited.

In order to prevent a short circuit between the inner connectors 131 and 132, the inner connectors 131 and 132 should be installed as far as possible between them so as to maintain an insulation gap. For example, the inner connectors 131 and 132 are located parallel to each other with a gap between the inner connectors 131 and 132 maintained at least 20 mm or more, but they are not limited to these.

The outer plane heating element 200 includes an outer pattern portion 210 arranged outside the inner pattern portion 110 in a predetermined shape and an outer electrode portion 220 connected to the outer pattern portion 210.

The outer pattern portion 210 is formed by a heating unit closely arranged in a ring-shaped limited area surrounding the outside of the inner pattern portion 110, the outer pattern portion 210 includes a start point and an end point, which are located at the outermost side of the outer pattern portion 210, along various paths and is configured in a symmetrical shape in the lateral direction. In another embodiment, the start point and the end point may be located at the innermost side of the outer pattern portion 210.

According to the embodiment, the outer pattern portion 210 may also include a plurality of outer tracks 211 and a plurality of outer bridges 212 like the inner pattern portion 110.

In addition, a portion of the inner connectors 131 and 132 may be located between the opening portion provided on one side of the outer pattern portion 210, that is, an opening between the outer bridges 212.

The outer electrode portion 220 includes an unheated unit extended from the start point and the end point of the outer pattern portion 210, and the outer electrode portion 220 includes an outer positive electrode 221 and an outer negative electrode 222.

The outer electrode portion 220 is located in the same direction as the inner electrode portion 120 so that current to the inner/outer plane heating elements 100 and 200 may be supplied by one power supply.

When current is supplied to the outer plane heating element 200 configured as described above, a current flows sequentially along the outer positive electrode 221, the outer pattern portion 210, and the outer negative electrode 222 like the inner plane heating element 100.

At this time, the outer pattern portion 210 is formed of a heating unit which generates heat at 600° C. or more, but the outer electrode portion 220 should be formed of an unheated unit which generates heat at 200° C. or less or hardly generates heat.

The outer electrode portion 220 may be thicker than the outer pattern portion 210 when considering the limited area on which the outer electrode portion 220 may be disposed so that the resistance of the outer electrode portion 220 is preferably configured to be substantially small.

As illustrated in FIG. 7A, a thickness $T_2$ of the outer positive electrode 221 is formed to be thicker than a thickness $T_1$ of the outer track 211, and the thickness $T_2$ of the outer track 211 may be formed in a range of 1.3 to 2.0 times the thickness $T_1$ of the outer track 211, but it is not limited thereto.

The outer negative electrode 222 may be also formed to be thicker than the thickness $T_1$ of the outer track 211.

Since the outer bridge 212 has an excessively curved shape as compared with the outer track 211, the outer bridge 212 may be locally heated due to a difference in current density between an inside and an outside of the outer bridge 212. Therefore, it is preferable that the outer bridge 212 also have a very small resistance in order to prevent local heating.

As illustrated in FIG. 7B, the thickness $T_3$ of the outer bridge 212 is formed to be thicker than the thickness $T_1$ of the outer track 211 and may be formed in a range in a range of 1.3 to 2.0 times the thickness $T_1$ of the outer track 211, but it is not limited thereto.

The outer plane heating element configured as described above may be configured so that the outer bridge and the outer electrode portion may be thicker than the outer tracks by a process of printing at least twice like the single-type plane heating element described above.

Figure 8:
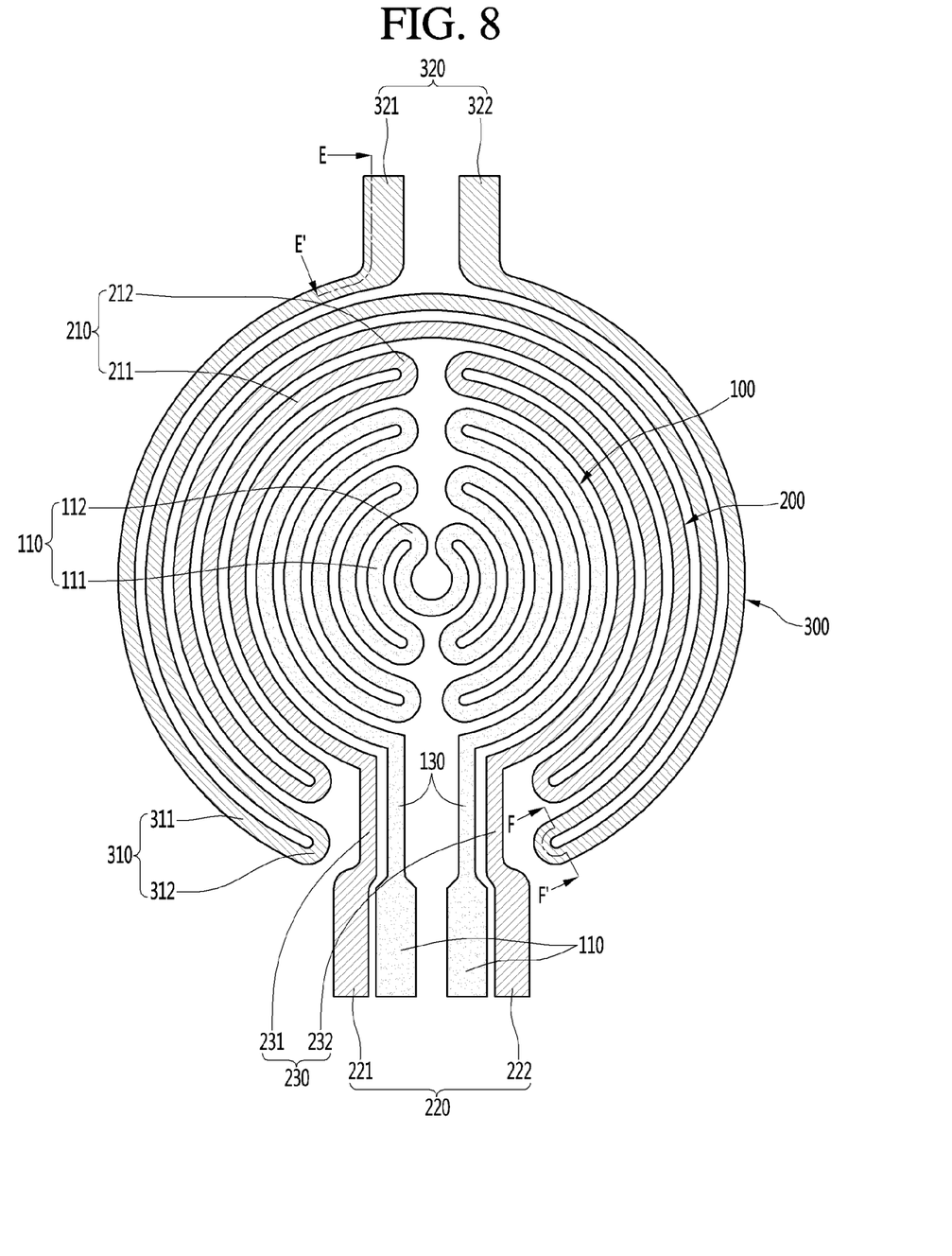
FIG. 8 is a plan view illustrating a triple-type plane heating element according to an embodiment of the present invention.
Figure 9A:
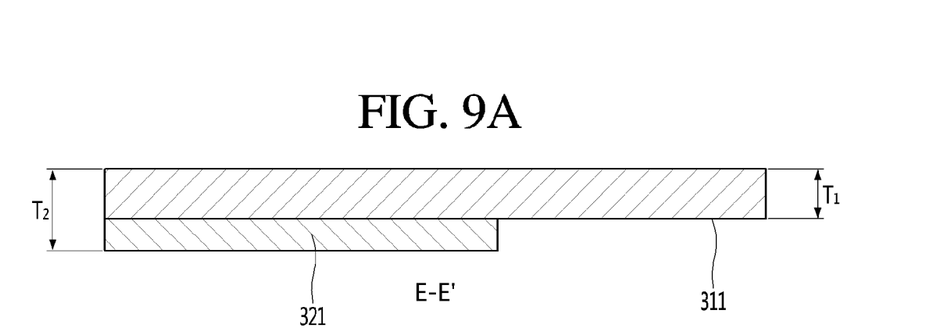
FIGS. 9A and 9B are cross-sectional views taken along lines E-E' and F-F' in FIG. 8.
Figure 9B:
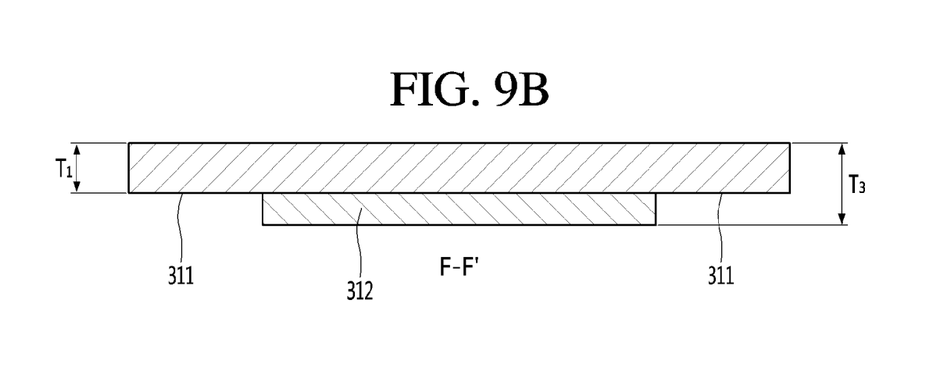

FIG. 8 is a plan view illustrating a triple-type plane heating element according to an embodiment of the present invention, and FIGS. 9A and 9B are cross-sectional views taken along lines E-E' and F-F' in FIG. 8.

As illustrated in FIG. 8, the triple-type plane heating element according to the present embodiment includes a first plane heating element 100 located at a center of a plane, a second plane heating element 200 located to surround the first plane heating element 100 and in the same plane, and a third plane heating element 300 located to surround the second plane heating element 200 and in the same plane.

Since the first plane heating element 100 includes a first pattern portion 110, a first electrode portion 120, and a first connector 130 and is configured like the inner pattern portion, the inner electrode portion, and the inner connector of the inner plane heating element described in the dual-type plane heating element, a detailed description thereof will be omitted.

Since the second plane heating element 200 includes the second pattern portion 210, the second electrode portion 220, and the second connector 230 and is configured like the outer pattern portion and the outer electrode portion of the outer plane heating element described in the dual-type plane heating element, a detailed description thereof will be omitted.

However, in the second plane heating element 200, the second connector 230 is formed as an auxiliary heating unit capable of generating heat at the same temperature as that of the second pattern portion 210, is a portion extended from the start point and the end point of the second pattern portion 210 to the second electrode portion 220, and is provided outside the first connector 130.

Accordingly, the first and second connectors 130 and 230 may be located between the opening portions provided at one side of the second and third pattern portions 210 and 310, that is, an opening between at least a pair of second and third bridges 212 and 312.

One second connector 231 connects between the start point of the second pattern portion 210 and the second positive electrode 221 and the other second connector 232 connects between the end point of the second pattern portion 210 and the second negative electrode 222.

The third plane heating element 300 includes a third pattern portion 310 arranged in a predetermined shape outside the second pattern portion 210 and a third electrode portion 320 connected to the third pattern portion 310.

The third pattern portion 310 is formed by a heating unit closely arranged in a ring-shaped limited area surrounding outside the second pattern portion 210, includes a start point and an end point, which are located at the outermost side of the third pattern portion 310, along various paths, and is configured in a symmetrical shape in the lateral direction.

According to the embodiment, the third pattern portion 310 may include a plurality of third tracks 311 and a plurality of third bridges 312 like the second pattern portion 210.

The third electrode portion 320 includes an unheated unit extending from the start point and the end point of the third pattern portion 310 and includes the third positive electrode 321 and the third negative electrode 322.

In order to supply current to the first and second plane heating elements 100 and 200 by one power supply and to supply current to the third plane heating element 300 by another power supply, the third electrode portion 320 may be located in a direction different, for example, opposite direction to that of the first and second electrode portions 120 and 220.

Current sequentially flows along the third positive electrode 321, the third pattern portion 310, and the third negative electrode 322 when current is supplied to the third plane heating element 300 configured as described above.

Similarly, the third pattern portion 310 may include a heating unit which generates heat at a temperature of 600° C. or higher, but the third electrode portion 320 should be formed of an unheated unit which generates heat at 200° C. or less, or hardly generates heat.

Therefore, it is preferable that the third electrode portion 320 is configured to have a much smaller resistance like the first and second electrode portions 120 and 220.

As illustrated in FIG. 9A, a thickness $T_2$ of the third positive electrode 321 is formed to be thicker than a thickness $T_1$ of the third track 311, and may be formed in a range of 1.3 to 2.0 times the thickness $T_1$ of the third track 311, but it is not limited thereto.

The third negative electrode 322 may be also formed to be thicker than the third track 311.

In addition, it is preferable that the third bridge 312 is configured to have a very small resistance in order to eliminate the local heating due to the current density difference, like the first and second bridges 112 and 212.

As illustrated in FIG. 9B, a thickness $T_3$ of the third bridge 312 is formed to be thicker than the thickness $T_1$ of the third track 311 and may be formed in a range of 1.3 to 2.0 times the thickness $T_1$ of the third track 311, but it is not limited thereto.

The third plane heating element configured as described above may be also formed by having the third bridge and the third electrode portions thicker than the third track by a process of printing at least twice like the dual-type first and second plane heating elements described above.

The present disclosure relates to an electric heater having one or more plane heating elements, and may be configured in various ways, such as the number and shape of the plane heating elements, and is not limited thereto. For example, more than three plane heating elements may be configured. For example, the plane heating elements may be square or rectangular shaped.

The foregoing description is merely illustrative of the technical idea of the present invention and various changes and modifications may be made by those skilled in the art without departing from the essential characteristics of the present invention.

Therefore, the embodiments disclosed in the present disclosure are intended to illustrate rather than limit the technical idea of the present invention, and the scope of the technical idea of the present invention is not limited by these embodiments.

The scope of protection of the present invention should be construed according to the following claims, and all technical ideas falling within the equivalent scope to the scope of protection should be construed as falling within the scope of the present invention.

What is claimed is:

1. An electric heater comprising:
a substrate; and
a plane heating element disposed on one surface of the substrate,
wherein the plane heating element includes:
a first plane heating element disposed at a center of the plane heating element, and
a second plane heating element disposed to surround the first plane heating element,
wherein the first plane heating element includes:
a first pattern portion including a first start point and a first end point;
a pair of first electrodes respectively connected to the first start point and the first end point of the first pattern portion,
a plurality of first tracks spaced apart from each other and having an arc shape increasing from an inside to an outermost aide of the first pattern portion,
a plurality of first bridges connecting the plurality of first tracks in series, and
a pair of first connectors respectively connected between the first pattern portion and the pair of first electrodes,
wherein the second plane heating element includes:
a second pattern portion including a second start point and a second end point, the second pattern portion surrounding at least a portion of the first pattern portion,
a pair of second electrodes respectively connected to the second start point and the second end point of the second pattern portion,
wherein a thickness of a first electrode of the pair of first electrodes is thicker than a thickness of the first pattern portion, the thickness being in a direction from the one surface of the substrate, and
a width of the first electrode of the pair of first electrodes is wider than a width of a first connector of the pair of first connectors,
wherein a thickness of a first bridge of the plurality of first bridges is thicker than a thickness of a first track of the plurality of first tracks.

2. The electric heater of claim 1,
wherein the thickness of the first electrode of the pair of first electrodes is thicker than a thickness of any first track of the plurality of first tracks.

3. The electric heater of claim 1,
wherein a thickness of a second electrode of the pair of second electrodes is thicker than a thickness of the second pattern portion.

4. The electric heater of claim 3,
wherein the second pattern portion includes:
a plurality of second tracks spaced apart from each other and having an arc shape increasing from an inside to an outermost side of the second pattern portion, and
a plurality of second bridges connecting the plurality of second tracks in series.

5. The electric heat of claim 4,
wherein the thickness of the second electrode of the pair of second electrodes is thicker than a thickness of any second track of the plurality of second tracks.

6. The electric heater of claim 4,
wherein a thickness of a second bridge of the plurality of second bridges is thicker than a thickness of a second track of the plurality of second tracks.

7. The electric heater of claim 3, further comprising:
a third plane heating element including:
a third pattern portion including a third start point and a third end point, the third pattern portion surrounding at least a portion of the second pattern portion,
at least a portion of the pair of first connectors are surrounded by the third pattern portion,
a pair of third electrodes respectively connected to the third start point and the third end point of the third pattern portion,
wherein a thickness of a third electrode of the pair of third electrodes is thicker than a thickness of the third pattern portion.

8. The electric heater of claim 7,
wherein the third pattern portion includes:
a plurality of third tracks spaced apart from each other and having an arc shape increasing from an inside to an outermost side of the third pattern portion, and
a plurality of third bridges connecting the plurality of third tracks in series.

9. The electric heater of claim 8,
wherein the thickness of the third electrode of the pair of third electrodes is thicker than a thickness of any third track of the plurality of third tracks.

10. The electric heater of claim 8,
wherein a thickness of a third bridge of the plurality of third bridges is thicker than a thickness of a third track of the plurality of third tracks.

11. A cooking appliance comprising:
a case forming an outer appearance;
a display;
an input unit;
a power supply;
the electric heater of claim 1 provided on the case; and
a controller for controlling the electric heater, the power supply, and the display according to an input from the input unit.

12. The electric heater of claim 2, wherein the thickness of the electrode of the pair of first electrodes is in a range of 1.3 to 2.0 times a thickness of any first track of the plurality of first tracks.

13. The electric heater of claim 1, wherein the thickness of the first bridge of the plurality of first bridges is in a range of 1.3 to 2.0 times the thickness of the first track of the plurality of first tracks.

14. The electric heater of claim 5, wherein the thickness of the second electrode of the pair of second electrodes is in a range of 1.3 to 2.0 times the thickness of any second track of the plurality of second tracks.

15. The electric heater of claim 6, wherein the thickness of the second bridge of the plurality of second bridges is in a range of 1.3 to 2.0 times the thickness of the second track of the plurality of second tracks.

16. The electric heater of claim 1, wherein an axis passes through a center of the electric heater in a radial direction and divides the pair of first electrodes and the pair of second electrodes, and the first pattern portion and the second pattern portion are symmetrical about the axis.

17. The electric heater of claim 1, wherein the pair of first connectors are an auxiliary heating unit capable of generating heat at a same temperature as the first pattern portion, and at least a portion of the pair of first connectors are surrounded by the second pattern portion.

18. The electric heater of claim 1, wherein the pair of first connectors have a gap therebetween of 20 mm or more.

* * * * *